United States Patent
Andersen

(10) Patent No.: US 10,037,271 B1
(45) Date of Patent: Jul. 31, 2018

(54) DATA-TEMPERATURE-BASED CONTROL OF BUFFER CACHE MEMORY IN A DATABASE SYSTEM

(75) Inventor: Brian M. Andersen, Del Mar, CA (US)

(73) Assignee: Teradata US, Inc., Dayton, OH (US)

( * ) Notice: Subject to any disclaimer, the term of this patent is extended or adjusted under 35 U.S.C. 154(b) by 181 days.

(21) Appl. No.: 13/535,323

(22) Filed: Jun. 27, 2012

(51) Int. Cl.
*G06F 17/00* (2006.01)
*G06F 12/08* (2016.01)
*G06F 12/0808* (2016.01)
*G06F 12/0815* (2016.01)
*G06F 12/02* (2006.01)

(52) U.S. Cl.
CPC .................... *G06F 12/0246* (2013.01)

(58) Field of Classification Search
CPC ............ G06F 11/1466; G06F 11/3668; G06F 12/0875; G06F 12/1027; G06F 12/0246; G06F 3/048; G06F 3/0484; G06F 12/0891; G06F 21/34; G06F 3/017; G06F 3/04842; G06F 3/0485; G06F 3/0487; G06F 3/0488
See application file for complete search history.

(56) References Cited

U.S. PATENT DOCUMENTS

| | | | | |
|---|---|---|---|---|
| 5,613,088 A * | 3/1997 | Achiwa | ............... | G06F 11/1076 360/53 |
| 6,032,224 A * | 2/2000 | Blumenau | ............... | G06F 12/08 710/15 |
| 6,256,713 B1 * | 7/2001 | Audityan | ............... | G06F 13/18 711/141 |
| 6,438,573 B1 * | 8/2002 | Nilsen | ............ | G06F 8/10 718/100 |
| 6,631,442 B1 * | 10/2003 | Blumenau | ............ | G06F 3/0607 711/100 |
| 6,782,410 B1 * | 8/2004 | Bhagat | ............... | G06F 9/5027 709/201 |
| 6,842,377 B2 * | 1/2005 | Takano | ............... | G11C 7/1021 365/185.21 |
| 7,017,011 B2 * | 3/2006 | Lesmanne | ............ | G06F 12/082 711/141 |
| 7,196,942 B2 * | 3/2007 | Khurana | ............ | G11C 7/1051 326/38 |
| 7,269,715 B2 * | 9/2007 | Le | ........... | G06F 9/3802 712/215 |
| 7,321,955 B2 * | 1/2008 | Ohmura | ............. | G06F 12/0804 711/113 |
| 7,512,736 B1 * | 3/2009 | Overby | ............... | G06F 3/0607 707/999.202 |
| 7,590,760 B1 * | 9/2009 | Banks | ................ | G06F 11/2028 709/223 |

(Continued)

*Primary Examiner* — Yaima Rigol
*Assistant Examiner* — Mohamed Gebril
(74) *Attorney, Agent, or Firm* — Randy L. Campbell, Jr.

(57) ABSTRACT

A database system may include a memory device that includes a least a portion to serve as a buffer cache and an array of persistent storage devices configured to store data of a database. The database system may monitor a frequency of data value associated with a first portion of data of the database stored in the buffer cache. The database system may maintain the first portion of data in the buffer cache in response to the frequency of data value associated with the first portion of data being greater than a frequency of data value associated with at least a portion of the data of the database stored in the array of persistent storage devices.

20 Claims, 6 Drawing Sheets

(56) References Cited

U.S. PATENT DOCUMENTS

| | | | | |
|---|---|---|---|---|
| 7,590,982 B1* | 9/2009 | Weissman | G06F 9/4812 | 710/260 |
| 8,166,244 B2* | 4/2012 | Fruchter | G06F 9/4445 | 711/103 |
| 8,230,193 B2* | 7/2012 | Klemm | G06F 3/0608 | 711/114 |
| 8,307,093 B2* | 11/2012 | Klemets | H04L 12/2818 | 370/254 |
| 8,365,201 B2* | 1/2013 | Holan | G06F 11/3051 | 715/763 |
| 8,463,984 B2* | 6/2013 | Olds | G06F 12/0866 | 711/103 |
| 8,566,546 B1* | 10/2013 | Marshak | G06F 3/0604 | 711/112 |
| 8,990,527 B1* | 3/2015 | Linstead | G06F 3/0617 | 711/161 |
| 2002/0087797 A1* | 7/2002 | Adrangi | G06F 12/0888 | 711/133 |
| 2004/0068621 A1* | 4/2004 | Van Doren | G06F 12/0828 | 711/144 |
| 2004/0078541 A1* | 4/2004 | Lightstone | G06F 9/5016 | 711/171 |
| 2005/0109828 A1* | 5/2005 | Jay | G06F 9/4451 | 235/375 |
| 2005/0125607 A1* | 6/2005 | Chefalas | G06F 12/0862 | 711/113 |
| 2007/0008328 A1* | 1/2007 | MacWilliams | G06F 12/0646 | 345/530 |
| 2008/0065815 A1* | 3/2008 | Nasu | G06F 3/061 | 711/103 |
| 2008/0155246 A1* | 6/2008 | Jennings | G06F 9/4401 | 713/2 |
| 2009/0094413 A1* | 4/2009 | Lehr | G06F 3/0605 | 711/112 |
| 2009/0228648 A1* | 9/2009 | Wack | G06F 11/1092 | 711/114 |
| 2009/0282101 A1* | 11/2009 | Lim | G06F 9/5077 | 709/203 |
| 2009/0287878 A1* | 11/2009 | Yamamoto | G06F 3/0616 | 711/103 |
| 2010/0046267 A1* | 2/2010 | Yan | G11C 16/24 | 365/51 |
| 2010/0050016 A1* | 2/2010 | Franklin | G06F 11/0727 | 714/6.32 |
| 2010/0083368 A1* | 4/2010 | Kristensen | G06F 21/34 | 726/18 |
| 2010/0125712 A1* | 5/2010 | Murase | G06F 11/1458 | 711/162 |
| 2010/0306288 A1* | 12/2010 | Stein | G06F 17/30312 | 707/609 |
| 2010/0332780 A1* | 12/2010 | Furuya | G06F 3/0689 | 711/162 |
| 2011/0202735 A1* | 8/2011 | Kono | G06F 11/1451 | 711/162 |
| 2011/0307745 A1* | 12/2011 | McCune | G06F 17/30221 | 714/54 |
| 2011/0317589 A1* | 12/2011 | Jolma | H04W 40/248 | 370/255 |
| 2012/0054421 A1* | 3/2012 | Hiratsuka | G06F 12/0246 | 711/103 |
| 2012/0072908 A1* | 3/2012 | Schroth | G06F 9/5033 | 718/1 |
| 2012/0191900 A1* | 7/2012 | Kunimatsu | G06F 12/0223 | 711/103 |
| 2012/0198107 A1* | 8/2012 | McKean | G06F 13/18 | 710/40 |
| 2013/0007373 A1* | 1/2013 | Beckmann | G06F 12/126 | 711/136 |
| 2013/0067161 A1* | 3/2013 | Chandra | G06F 13/12 | 711/114 |
| 2013/0080805 A1* | 3/2013 | Vick | G06F 8/4432 | 713/320 |
| 2013/0111129 A1* | 5/2013 | Maki | G06F 3/0611 | 711/117 |
| 2013/0152097 A1* | 6/2013 | Boctor | G06F 9/505 | 718/103 |
| 2013/0326270 A1* | 12/2013 | Chen | G06F 11/2089 | 714/6.21 |
| 2014/0003114 A1* | 1/2014 | Pellizzer | H01L 27/2481 | 365/63 |
| 2014/0258670 A1* | 9/2014 | Venkatasubramanian | G06F 12/023 | 711/171 |

* cited by examiner

DATA-TEMPERATURE-BASED CONTROL OF BUFFER CACHE MEMORY IN A DATABASE SYSTEM

BACKGROUND

1. Technical Field

The present disclosure relates generally to database systems, and in particular, to buffer cache memory of a database system.

2. Related Art

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

Typical database data, such as database tables, is stored in persistent storage devices intended to store data indefinitely. As data is accessed from the persistent storage devices or initially loaded into a database, the data may be stored in buffer cache memory. Buffer cache memory allows the data to be quickly accessed without the need to retrieve it from persistent storage devices which is typically more time-intensive. However, in database systems that implement data temperature-based storage, buffer cache memory is not monitored for data accessing. Thus, data may remain in buffer cache memory due to it being accessed at a high rate. However, because the data is migrating from the persistent storage devices and not being monitored at the buffer cache memory, the database system may assume that the data in the buffer cache memory is not being accessed frequently and replace it with data migrating from the persistent storage devices.

SUMMARY

In one aspect of the present disclosure, a database system may include a memory device configured to include at least a portion to serve as a buffer cache. The database system may also include an array of persistent storage devices configured to store data of a database. The database system may also include a processor in communication with the array of persistent storage devices and the memory device. The database system may also include a storage management module executable by the processor to monitor a frequency of data value associated with a first portion of data of the database stored in the buffer cache. The storage management module may be further executable by the processor to maintain the first portion of data in the buffer cache in response to the frequency of data value associated with the first portion of data being greater than a frequency of data value associated with at least a portion of the data of the database stored in the array of persistent storage devices.

In another aspect of the disclosure, a method may include receiving multiple access requests to the first portion of data of a database, wherein the first portion of data is stored in a buffer cache of a memory device. The method may further include determining a frequency of data value associated with the first portion of data based on the multiple access requests. The method may further include determining at least one other frequency of data value associated with other data of the database, wherein the other data is stored in at least one persistent storage device. The method may further include maintaining the first portion of data in the buffer cache in response to the frequency of data value of the first portion of data being greater than a frequency of data value associated with the other data stored in the at least one persistent storage device.

In another aspect of the disclosure, a computer-readable medium may be encoded with computer-executable instructions that may be executable with a processor. The computer-readable medium may include instructions to monitor a frequency of data value associated with the first portion of data stored in a memory device. The computer-readable medium may also include instructions to determine at least one other frequency of data value associated with other data of the database, wherein the other data is stored in a persistent storage device. The computer-readable medium may include instructions to maintain the first portion of data in the memory device in response to the frequency of data value of the first portion of data being greater than a frequency of data value associated with the other data stored in the persistent storage device.

The various aspects of the disclosure may be implemented as a system, method, or instructions stored on computer-readable media or may be implemented as a combination thereof.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE DRAWINGS

Figure 1:
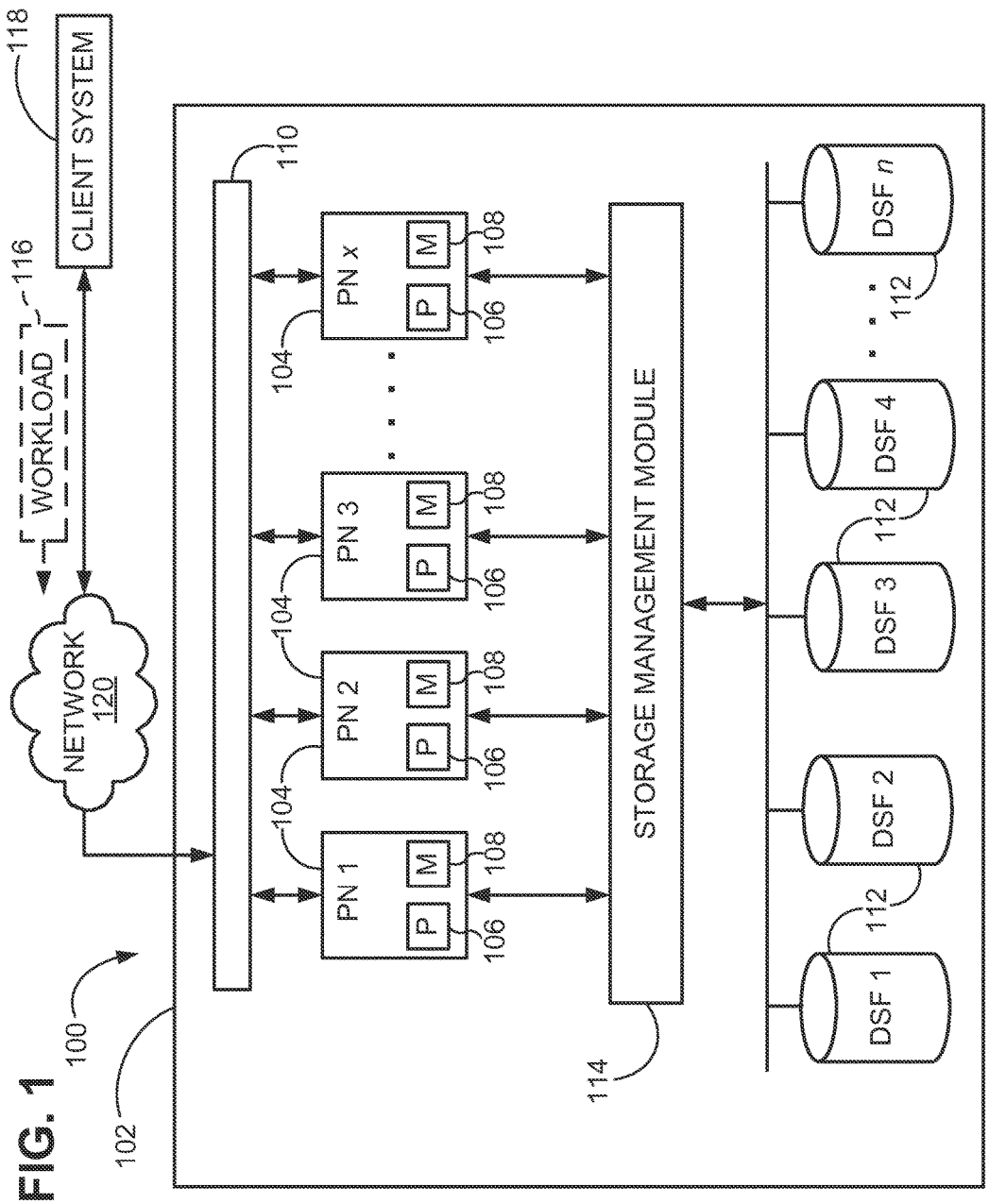
FIG. 1 is a block diagram of an example database system.

FIG. 1 is a diagrammatic representation of example architecture for a database system 100. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memories, etc.). In the example of FIG. 1, the RBDMS 102 may be a massive parallel processing (MPP) system having an array of processing units and distributed memory and storage. In alternative examples, the RBDMS 102 may implement a single processing unit, such as in a symmetric multiprocessing (SMP) system configuration.

The RBDMS 102 may include one or more processing units used to manage the storage, retrieval, and manipulation of data in the data-storage facilities. The array of processing units may include an array of processing nodes (PN) 104 that manage the storage, retrieval, and manipulation of data included in a database. In FIG. 1, the processing nodes 104 are individually indexed as PN x, where x may represent the total number of processing nodes 104 in the database system 100 or, alternatively, may represent the total number of active processing nodes 104 in the database system.

Each of the processing nodes 104 may include one or more processors 106 and one or memories 108. The memory 108 may include one or more memories and may be computer-readable storage media or memories, such as a cache, buffer, RAM, removable media, or other computer-readable storage media. Computer-readable storage media may include various types of volatile and nonvolatile storage media. Various processing techniques may be implemented by processors, such as the processor 106, such as multiprocessing, multitasking, parallel processing and the like, for example.

Each of the processing nodes 104 may communicate with one another through a communication bus 110. The communication bus 110 allows communication to occur within and between each processing node 104. For example, implementation of the communication bus 110 provides media within and between each processing node 104 allowing communication among the various processing nodes 104 and other component processing units. The communication bus 110 may be hardware, software, or some combination thereof. In instances of at least a partial-hardware implementation of the communication, the hardware may exist separately from any hardware (e.g, processors, memory, physical wires, etc.) included in the processing nodes 104 or may use hardware common to the processing nodes 104. In instances of at least a partial-software implementation of the communication bus 110, the software may be stored and executed on one or more of the memories 108 and processors 106, respectively, of the processing nodes 104 or may be stored and executed on separate memories and processors that are in communication with the processing nodes 104. In one example, the communication bus 110 may include multi-channel media such that if one channel ceases to properly function, another channel may be used. Additionally or alternatively, more than one channel may also allow distributed communication to reduce the possibility of an undesired level of communication congestion among processing nodes 104.

The RDBMS 102 may include an array of data storage facilities (DSFs) 112. The DSFs 112 may include persistent storage such as hard disk drives, flash drives, or any other suitable non-volatile memory devices where data may be stored such as database tables. The DSFs 112 may include various types of persistent storage devices with varying degrees of performance. Such degrees of performance may involve how quickly data can be retrieved from a particular the DSF 112. In conventional databases, retrieval time of data is a crucial aspect of overall performance. Thus, it is more efficient to store database data most likely to be accessed with greater frequency than other database data in storage devices that allow faster retrieval. In FIG. 1, the DSFs 112 are individually indexed as 1 through n where n is the number of DSFs 112.

Figure 2:
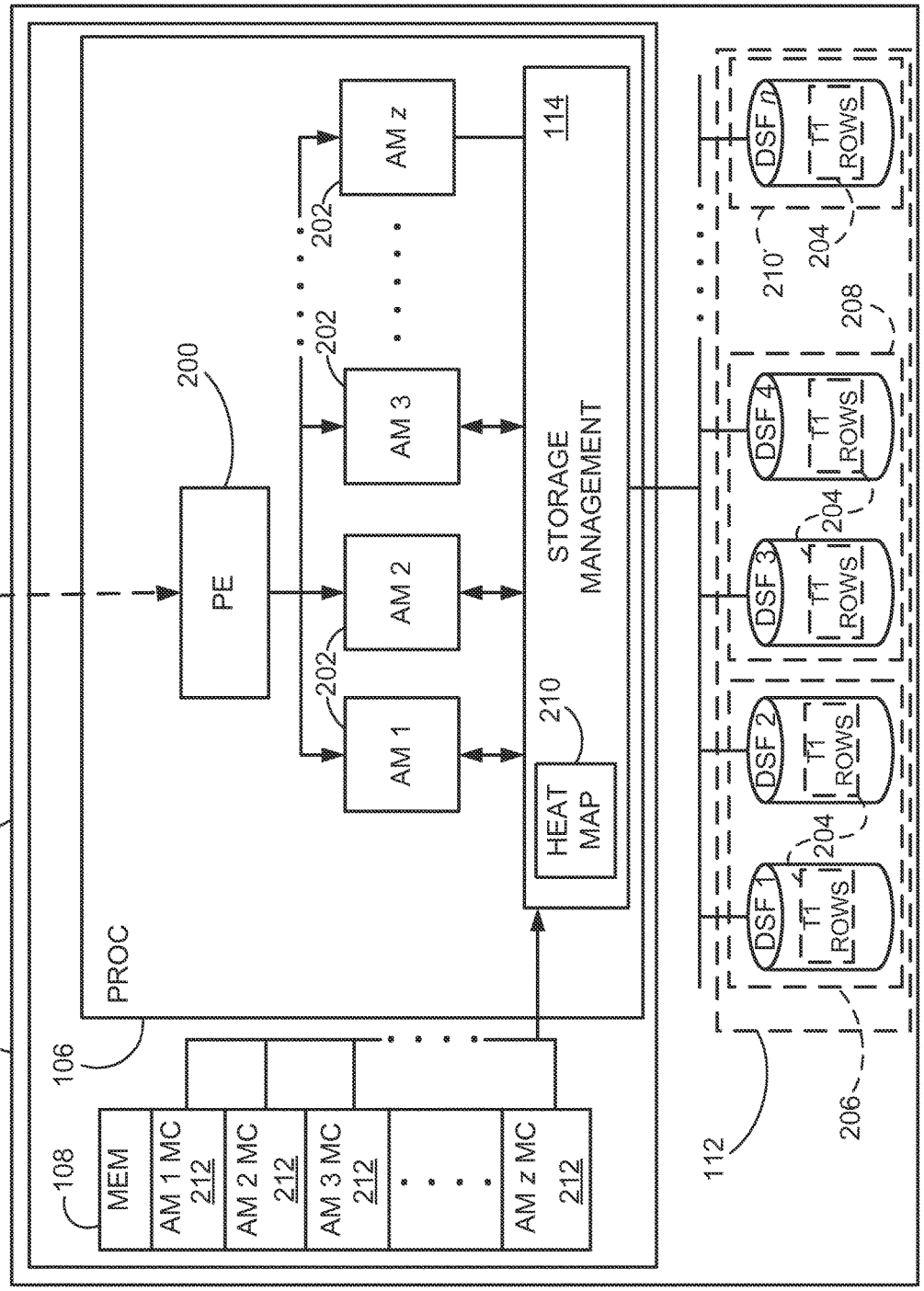
FIG. 2 is a block diagram of a portion of the example database system of FIG. 1.

In one example, and as discussed in further detail with regard to FIG. 2, a storage management module 114 may determine on which persistent storage device(s) of the DSFs 112 that particular database data is to be stored. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors.

During operation, a workload 116 may be initially transmitted via a client system 118 to the RBDMS 102. In one example, the workload 116 may be transmitted over a network 120. The network 120 may be wired, wireless, or some combination thereof. The network 120 may be a virtual private network, web-based, directly-connected, or some other suitable network configuration. In one example, the client system 118 may run a dynamic workload manager (DWM) client (not shown). Alternatively, the database system 100 may include a mainframe (not shown) used to interact with the RBDMS 102. The workload 116 may include one or more database tasks to be performed by the RBDMS 102. For example, the workload 116 may contain any combination of queries, database utilities (e.g., data insertion or deletion), as well as, any other type of database-related activity.

FIG. 2 is a block diagram of a portion of the RBDMS 102 that includes a single processing node 104. Each processing node 104 may include one or more parsing engine (PE) modules 200 and one or more access modules (AM) 202. In one example, the access modules 204 may be access module processors (AMPs), such as those implemented in the Teradata Active Data Warehousing System®. The parsing engine modules 200 and the access modules 202 may each be virtual processors (vprocs) and/or physical processors. In the case of virtual processors, the parsing engine modules 200 and access modules 202 may be executed by one or more physical processors 106, such as those that may be included in the processing nodes 104. For example, in FIG. 2, the parsing engine module 200 and access module 202 is associated with a respective processing node 104 and may each be executed as one or more virtual processors by physical processors 106 included in the respective processing node 104. In FIG. 1, each processing node 104 is shown as including a single parsing engine module 200 and access modules 202, such that there are more parsing engine modules 200 and access modules 202 total than processing nodes 104. In one example, during operation, the one or more physical processors 106 included in the processing nodes 104 may execute the parsing engine modules 200 and access modules 202 by switching between the executions of the various modules at a rapid rate allowing the vprocs to substantially operate in "parallel."

During operation, the parsing engine modules 200 may receive the workloads 116 and generate to determine the content. The parsing engine module 200 processing the workload 116 may transmit specific instruction to access modules 202 having a common processing node 104 or a different one. The access modules 202 may execute the instructions in parallel to carry out activities related to the processed workload 116.

The RBDMS 102 stores database data in one or more tables in the DSFs 112. In one example, rows 204 of a table, "T1," are distributed across the DSFs 112 and in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to DSFs 112 and associated access modules 202 by a hash bucket map. The characteristics of the columns chosen for the primary index determine how evenly the rows are distributed.

Rows of each stored table may be stored across multiple DSFs 112. Each access module 202 may be associated with specific rows of database tables. Thus, when processing particular rows, the particular rows may be retrieved by dedicated access modules, however, the rows may be passed between access modules 202 during processing in order to appropriately respond to a query or other workload-related activity. This allows the access modules 202 to process data in parallel to expedite workload response.

During operation, specific data stored in the DSFs 112 may be more frequently accessed as compared to other data based on the workload 116 contents. In one example, the DSFs 112 may be organized into tiers with each tier representing a level of performance for a persistent storage device, such as time involved in retrieving data from a particular storage device. Thus, more-frequently-accessed data may be placed on specific DSFs 112 that may be accessed more quickly. For example, the DSF tier 206, which includes DSF 1 and DSF 2 may represent persistent storage devices having the highest rate of data retrieval with respect to other DSFs 112. DSF tier 208, which includes DSF 3 and DSF 4 may represent a tier having relative midrange level of performance. DSF n may be part of DSF tier 212, which may represent a relative lowest level of performance.

With the DSF tier 204 being the most quickly accessible, the data being accessed most-frequently should be placed in the DSFs 108 of the tier 206, if possible. In one example, the storage management module 114 may determine in which of the DSFs 112 data may be stored. In one example, the storage management module 114 may determine the frequency of the data, which may include the frequency with which data is accessed as well as the "priority" of the data. The priority of the data may be a predetermined quantifiable characteristic associated with data in database. The priority may be given to data upon initial loading into a database. The frequency of the data may then be a value that is based on both the access frequency and the priority of the data. Data having both the highest priority value and highest access frequency value in a database would then have the highest frequency of data value.

The frequency of data may also be referred to as the "temperature" of the data. Reference to the temperature of the data provides a qualitative description of the quantitative frequency of the data. Thus, the higher the frequency of data, the higher the "temperature" of the data. For purposes of this disclosure, reference to determining the "temperature" of data may be considered as referring to determining the quantitative frequency of the data. For example, data having a higher frequency of data compared to other data may be referred to as being "hotter" than the other data and the other data may be referred to as being "colder" compared to the data having the higher frequency of data.

In one example, the storage management module 114 may determine data temperature of data across predetermined-sized data portions. For example, the storage management module 114 may determine data temperature of data in "extents" that are approximately 2 megabytes (MB) in size. However, other predetermined sizes of data portions may be evaluated, such as at the data block level, or other portion size. Thus, while data within the extent being evaluated may be of different respective temperatures, the storage management module 114 may determine the overall data temperature of the extent being evaluated. The extent of data being evaluated may be stored on the same persistent storage device and or may be a stored across multiple persistent storage devices. Each extent of data may include multiple database table rows for a relational database. In such a scenario, the overall temperature of the data portion may be determined, which may include some rows that are being accessed heavily, while some that are not. However, the overall temperature of the data portion under analysis may be relatively high due to the accessing of the particular rows included in the data portion. In other examples, the storage management module 114 may determine data temperature over variously-sized data portions.

In one example, the storage management module 114 may determine the data temperature of data stored in the DSFs 112. In one example, the storage management module 114 may monitor the inputs/outputs (I/Os) with respect to extents of the DSFs 112 to determine data temperature, including the relatively most-frequently accessed data, which may be designated as the "hottest" data. The storage management module 114 may monitor and update a heat map 210. In one example, the heat map 210 may represent a data object that includes the frequency of data values for data stored in the database. As data is accessed for analysis, manipulation, or otherwise used, the storage management module 114 may update the heat map 210 to reflect any changes in frequency of data values. The heat map 210 is further described with regard to FIG. 3.

In one example, the storage management module 114 may be distributed amongst some or all of the processing nodes 104. Thus, each processing node 104 may execute a "local" storage management module 114 on the one or more respective processors 106. Thus, each processing node 104 may include a local storage management module 114 responsible for storing data associated with the access modules 202 being executed on that particular processing node 104. The communication bus 110 may allow all processing nodes 104 to communicate, and thus the storage management module 114 of each processing node 104 may be aware of the overall condition of data storage with respect to all processing nodes 104. Thus, the heat map 210 of each distributed storage management module 114 may indicate the entire state of data storage for a particular database or databases.

The memory 108 of each processing node 104 may include a portion respectively dedicated to each access module 202 that serves as a buffer cache 212. In FIG. 2, each buffer cache 212 is designated as AM 1 MC through AM z MC, with each buffer cache 214 being associated with a respective one of the access modules 202. The buffer cache 212 may refer to a portion of memory where the RDBMS 102 accesses the data. The RDBMS 102 searches the buffer cache to determine if desired data resides in the buffer cache. If the data does not reside in the buffer cache 212, the data requires to retrieval from the DSFs 112. Buffer cache is designed to accommodate a small portion of the overall data in the RDBMS 102 with the majority of the data residing on persistent non-volatile storage (e.g., hard disk drive and/or flash drive) such as the DSFs 112. Buffer cache is designed for very high performance, which makes it desirable to use, however, memory is volatile, and thus, for memory-based buffer cache it is desirable to have some manner to persist any of the data that is in buffer cache. In one example, the RBDMS 102 may log the data present in the buffer cache in case a system error causes loss of buffer cache data. The lost data may be retrieved using the logs to identify the particular data and then be placed into the buffer cache. Alternatively or in addition, the DSFs 112 may store all RBDMS 102 data, so that any data residing in the buffer cache may also be stored in the DSFs 112.

During operation of the RBDMS 102, data may be loaded into the buffer caches 212 through various manners. For example, data may be loaded into the buffer caches 212 during an initial loading of the data into the RBDMS 102. The data may also be loaded into the buffer caches 212 when processing of the data is required to respond to a query or other workload-related activity. In situations requiring retrieval, the access module 202 associated with the requested data may retrieve the data from the DSFs 112 via the storage management module 114. Once data is loaded into the buffer cache 212, it may be accessed by the associated access modules 202. If accessed at a high enough rate, the data would remain in the buffer cache 212 and not be replaced. In such a situation, without knowledge of the buffer cache 212 access patterns, the storage management module 110 may not recognize that the data in the buffer cache 212 is being frequently accessed and this data would be discarded when other data in the DSFs 112 is requested and placed in the buffer cache. For example, such a scenario may occur when the storage management module 114 uses a least-recently used (LRU) algorithm to determine which data in the buffer cache 212 is the first to be discarded when other data is to be placed in the buffer cache 212. The LRU algorithm may mistakenly select data that has remained in the buffer cache 212 due to frequency of access. Because the storage management module 114 typically bases data temperature on the I/Os associated with the DSFs 112, the storage management module 114, without knowledge of cache hits or other access on the buffer cache 212, may interpret data remaining in buffer cache 212 as being cold data since there would be no I/Os at the DSFs 112.

In order to allow the storage management module 114 to accurately reflect the data temperature in the heat map 210, the storage management module 114 may be given access to the buffer cache 212. With access to the buffer cache 212, the storage management module 114 may determine the temperature of data in the buffer cache 214, as well as the DSFs 112. With such access, the storage management module 114 may update the heat map 210 to reflect that frequently accessed data in the buffer cache 212 is hot or warm, so that other data is not erroneously determined to be "hotter," which could lead to an overwrite of the data in the buffer cache 212. An overwrite of the data may require the overwritten data to be subsequently retrieved from the DSFs 112, which uses more time and computing resources than the data simply remaining in and being accessed from the buffer cache 212.

Figure 3:
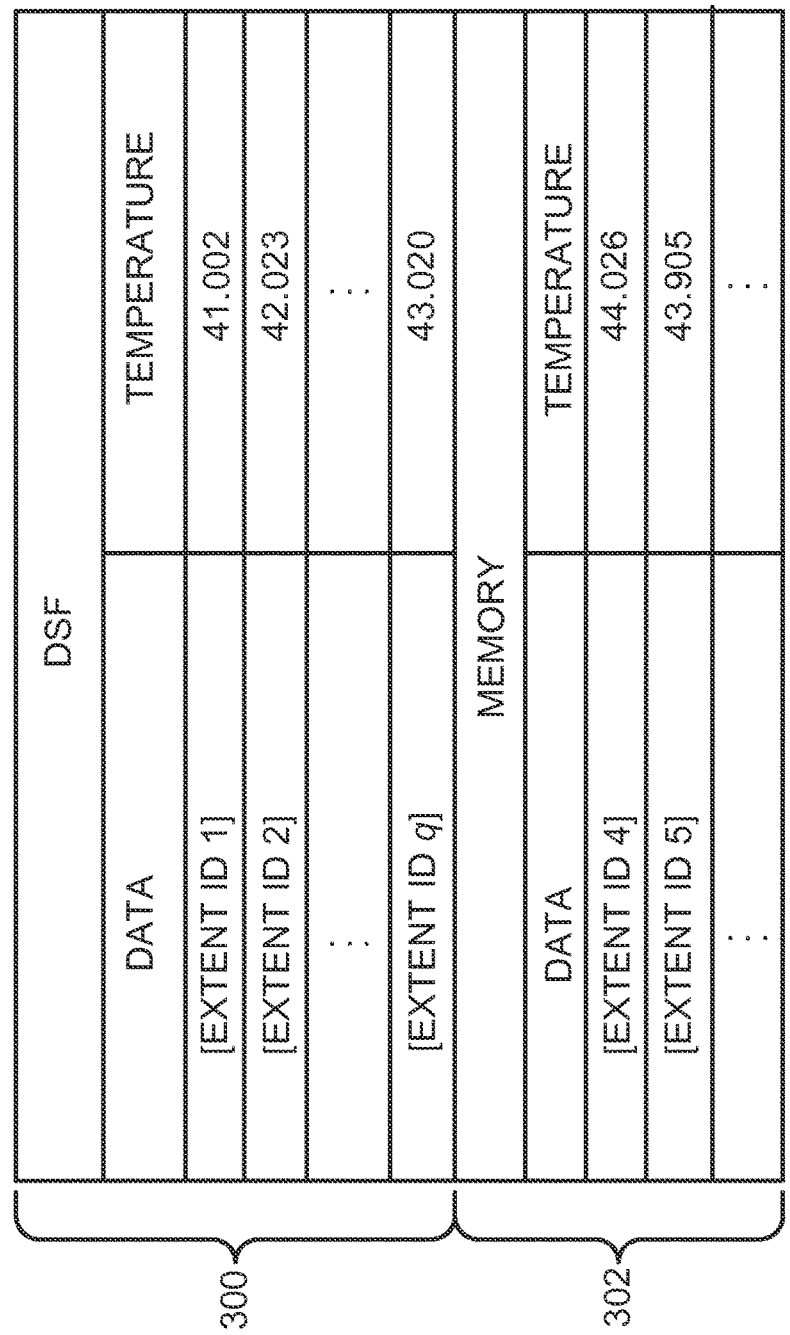
FIG. 3 is an example of a heat map.

FIG. 3 is an example of contents of the heat map 210. In one example, the heat map 210 may include a portion 300 dedicated to the database data stored in the DSFs 112 and another portion 302 dedicated to the database data stored in the memory. In one example, the heat map 210 includes two columns. One to identify a particular portion of data and another column for the corresponding data temperature, or frequency of data, value for the particular portion of data. In the example of FIG. 3, the "DATA" column may include the identification of each extent of data, represented as "EXTENT ID 1" through "EXTENT ID q," where q is the number of extents. Extents that are being stored in the buffer caches 212 may also be identified by the particular extent, since extents loaded into buffer cache are not deleted from the DSFs 112. In scenarios in which data is initially loaded into the RDBMS 102, the data is loaded into the buffer cache 212 and is assigned and loaded into a extent in the DSFs 112. The data may remain in the buffer cache 212 if its associated temperature remains high enough.

In FIG. 3, the data temperature is represented by a numerical value, with the higher the value indicating a higher data temperature, or frequency of data. In the example of FIG. 3, the extent having EXTENT ID 4 stored in the buffer cache has the highest data temperature followed by the extent having EXTENT ID 5. Both have higher data temperatures than those shown being stored in the DSFs 112. Over the course of operation, if data temperatures of the extents stored in the DSFs 112 become greater than those being stored in the buffer caches 212, the storage management module 114 may indicate that the extents of the DSFs 112 having higher data temperatures than those stored in the buffer caches 212 be loaded into the buffer caches 212, replacing those extents in the buffer caches with the lowest data temperatures.

Figure 4:
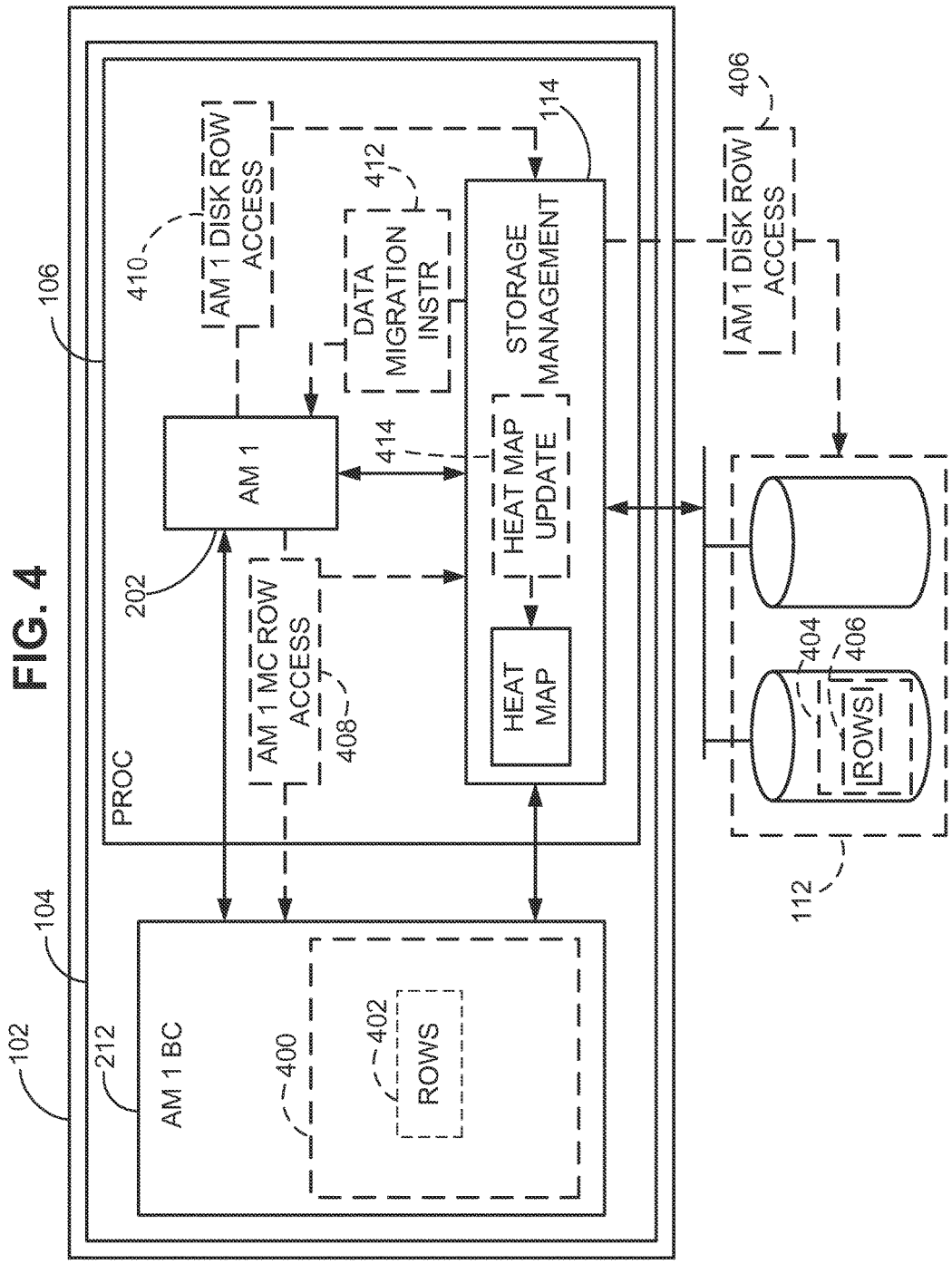
FIG. 4 is an example block diagram of operation of the database system of FIG. 1.

FIG. 4 is a block diagram of example operation of the RBDMS 102 with the storage management module 114 having access to the buffer cache 212. In particular, FIG. 4 shows the operation of the access module AM 1 and the storage management module 114. For purposes of example, the buffer cache AM 1 BC is shown as including extent 400 that contains table rows 402 and the DSFs 112 are shown as including extent 404 including table rows 406 associated with the access module AM 1. The rows 402 and 406 may be from a common database table or different database tables. The access module AM 1 may perform an access 408 of rows 400 stored in the buffer cache AM 1 BC and may perform an access 410 of rows 406 of the DSFs 112. The accesses 408 and 410 are shown for purposes of example. In operation, accesses such as accesses 408 and 410 may be performed serially by the access module AM 1. The accesses 408 and 410 may be performed in order for the access module AM 1 to process the accessed data in response to a received query or other workload-related activity. In one example, accesses 410 involving the DSFs 112 may be performed through the storage management module 114, which may access the particular rows on behalf of the access module AM 1. The storage management module 114 may be aware of the buffer cache AM 1 BC contents, and thus, be in a position to determine the data temperature of data in the buffer cache AM 1 BC based on cache hits.

Based on the access patterns through accesses such as 408 and 410, as well as data priority, the storage management module 114 may determine that the data being accessed should either remain in the current locations (e.g., buffer cache 212 or DSFs 112) or be relocated, which may include data within a particular DSF tier migrating to another one. In one example, the number of accesses 410 of the rows 406 may increase to exceed that of the accesses 408 to such a degree warranting placement of rows 406 in the buffer cache AM 1 BC. The storage management module 114 may generate data migration instructions 412, which may be executed by the access modules 202. An access module 202 receiving the instructions 412 may execute the instructions 412 accordingly and access the rows 406 allowing them to migrate from the DSFs 112 to the buffer cache 212. Based on the temperature change of the data, the storage management module 114 may generate a heat map update 414 in order to update the heat map 216 to reflect the updated data temperatures.

Figure 5:
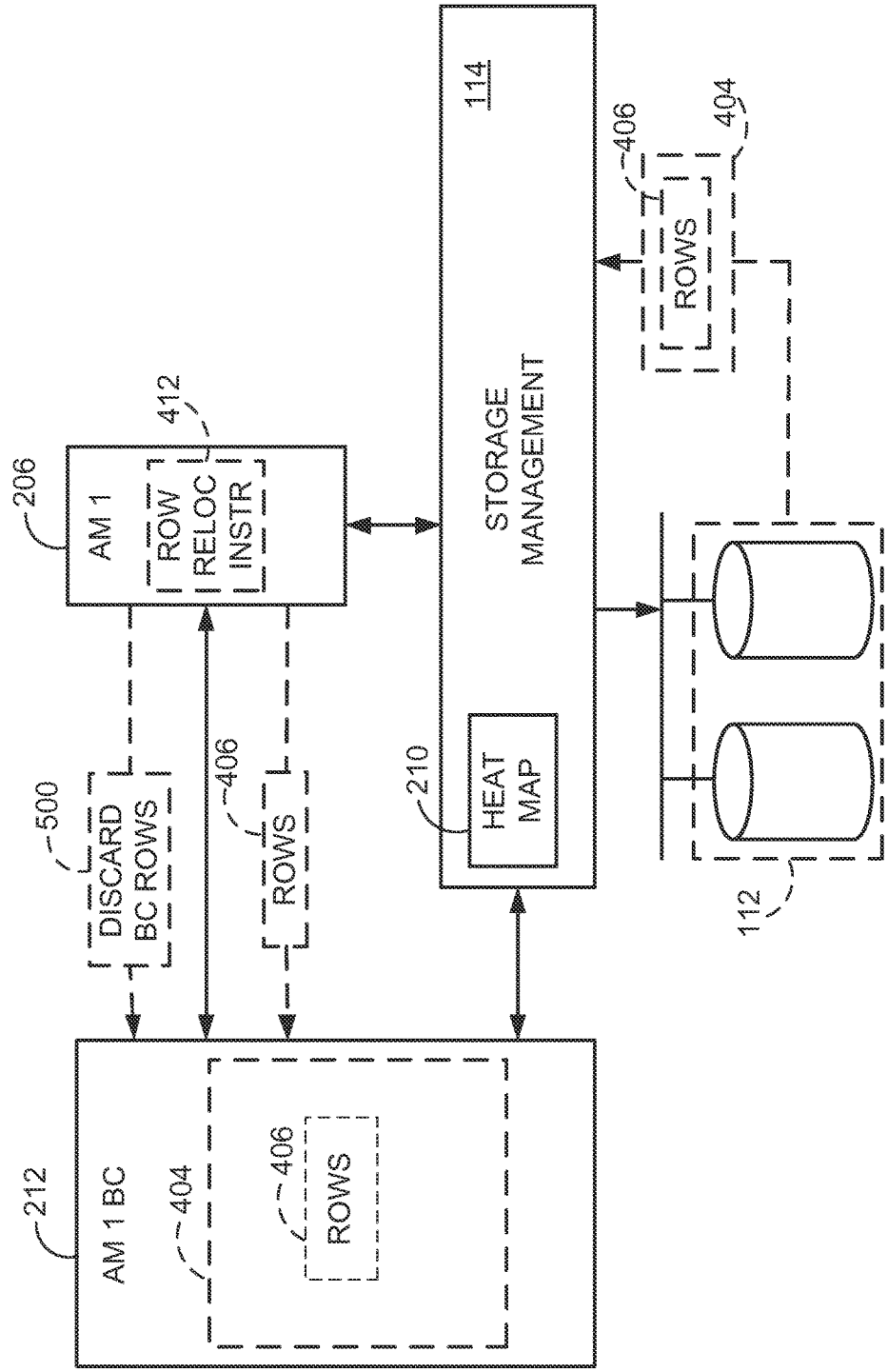
FIG. 5 is an example block diagram of further operation of the database system of FIG. 1.

FIG. 5 is a block diagram of example operation of the RBDMS 102 after the data migration instructions 410 have been received by the access module AM 1. FIG. 5 shows a scenario involving both migration of the extent 404 containing rows 406 from the DSF 112 to the buffer cache 212.

Based on the data migration instructions 412, the access module AM 1 may perform a discard 500 of the data portion 400 in the buffer cache AM 1 BC. The data portion 400 is typically already stored in the DSFs 112 so that the discard will not result in a permanent loss of data. The data portion 404 may be transmitted to the access module AM 1 for placement in the buffer cache AM 1 BC by the access module AM 1 in conformance to the data migration instructions 412. In other examples, the access module AM 1 may overwrite the rows of extent 400 with the loading of the extent 404 with the need to perform an explicit discard.

Figure 6:
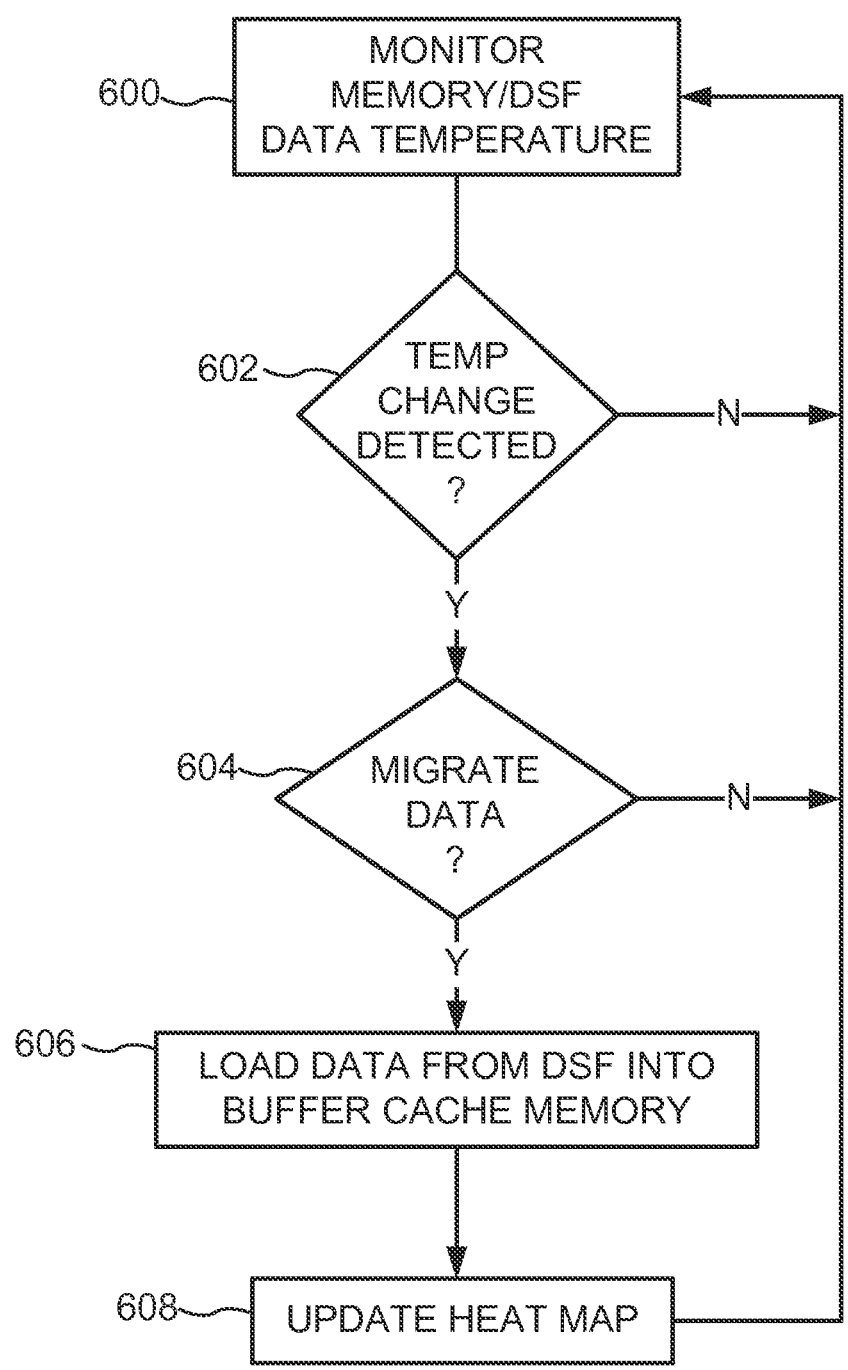
FIG. 6 is an operational flow diagram of example operation of the database system of FIG. 1.

FIG. 6 is an example operational flow diagram of the RBDMS 102. In one example, the storage management module 114 may monitor the data temperature of the buffer cache 212 and the DSFs 112 (600). In one example, the monitoring performed by the storage management module 114 may be done at routine intervals or may be performed according to other algorithms. Data temperature may be determined based on predetermined-sized data portions, such as data extents, for example. During the monitoring of the DSFs 112 and the buffer cache 212, a temperature change in data may be detected (602). A temperature change may include data in the DSF 112 becoming hotter (i.e., higher frequency of data) than data currently in the buffer cache 212. This occurrence may be due to data in the DSF 112 increasing in frequency of data or may occur due to the frequency of data in the buffer cache 212 decreasing below that of the data in the DSF 112.

Based on the data temperature, the storage management module 114 may determine if data is to migrate from the DSFs 112 to the buffer cache 212 (604). In one example, the temperature change detection triggering data relocation may involve one or more thresholds. For example, the storage management module 114 may determine data migration between the DSFs 112 and the buffer cache 212 based on a time threshold. If a data temperature change occurs for a predetermined period of time, the storage management module 114 may perform the migration. The storage management module 114 may also implement a temperature-differential-based threshold. In one example, if the frequency of data difference between buffer cache data and DSF data reaches a value greater than a predetermined value, the storage management module 114 may perform the data migration. In other examples, the storage management module 114 may implement both thresholds or may implement other thresholds with or separately from the time-based and temperature-differential-based thresholds.

If data migration is to occur, the storage management module 114 may move data selected for migration from the DSFs 112 to the buffer cache 212 (606). Data in the DSFs 112 selected for migration may be placed in the buffer cache 212 if not already present and remain until its data temperature warrants replacement. The heat map 210 may be updated to reflect the temperature changes (608). In examples involving multiple heat maps 210, each heat map 210 may be updated accordingly.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A database system comprising:
   a volatile memory device configured to include at least a portion to serve as a buffer cache, wherein the buffer cache is configured to implement a data retention policy, wherein the data retention policy is configured to overwrite least-recently used data in the buffer cache when new data is to be loaded into the buffer cache and size of the new data is greater than free space in the buffer cache;
   an array of persistent non-volatile storage devices configured to store data of a database, wherein the data of the database is loaded into the volatile memory device when accessed for use;
   a processor in communication with the array of persistent non-volatile storage devices and the volatile memory device; and
   a storage management module executable by the processor to:
   monitor a frequency of data value associated with a first portion of the data of the database stored in the buffer cache of the volatile memory; and
   store the first portion of data in the buffer cache of the volatile memory in response to the frequency of data value associated with the first portion of data being greater than a frequency of data value associated with at least a portion of the data of the database stored in the array of persistent non-volatile storage devices, wherein the first portion of data is available to read operations and write operations while stored in the buffer cache of the volatile memory;
   determine that other data stored in the array of persistent storage device is to be accessed for use; and
   override the data retention policy of the buffer cache to exclude the first portion of data from being overwritten by the other data stored while the first portion of data not actively being accessed for use, while the frequency of data value associated with the first portion of data remains greater than a frequency of data value associated with the at least a portion of the data of the database stored in the array of persistent non-volatile storage devices, the first portion of data is the least recently used data in the buffer cache and size of the other data is greater than free space in the buffer cache.

2. The database system of claim 1, wherein the storage management module is further executable by the processor to determine the frequency of data value associated with the first portion of data.

3. The database system of claim 2, wherein the storage management module is further executable by the processor to:
   determine a frequency of data value of a second portion of the data of the database stored in the array of persistent non-volatile storage devices; and
   replace the first portion of data in the buffer cache with the second portion of data in response to the frequency of data value of the second portion of data being greater than the frequency of data value of the first portion of data.

4. The database system of claim 3, wherein the first portion of data and the second portion of data are the same size.

5. The database system of claim 1, wherein the frequency of data value of the first portion of data is based on frequency of access of the data by the processor.

6. The database system of claim 1, wherein the frequency of data value of the first portion of data is based on a number cache hits on the buffer cache.

7. The database system of claim 1, wherein the frequency of data value of the first portion of data is based on a priority value assigned to the first portion of data, wherein the priority value is representative of a hierarchical position of the first portion of data with respect to the data stored in the array of persistent non-volatile storage devices.

8. The database system of claim 1, wherein the storage management module is further executable by the processor to:
  determine a number of inputs and outputs associated with the data stored in the array of non-volatile persistent storage devices; and
  determine the frequency of data value based on the number of inputs and outputs associated with the data stored in the array of non-volatile persistent storage devices.

9. A method comprising:
  receiving, with a processor, multiple access requests to a first portion of data of a database, wherein the first portion of data is stored in a buffer cache of a volatile memory device based on the multiple access requests, wherein the buffer cache is configured to implement a data retention policy, wherein the data retention policy is configured to overwrite least-recently used data in the buffer cache when new data is to be loaded into the buffer cache and size of the new data is greater than free space in the buffer cache;
  determining, with the processor, a frequency of data value associated with the first portion of data based on the multiple access requests;
  determining, with the processor, at least one other frequency of data value associated with other data of the database, wherein the other data is stored in at least one persistent nonvolatile storage device and is loaded into the volatile memory device when accessed for use; and
  storing, with the processor, the first portion of data in the buffer cache in response to the frequency of data value of the first portion of data being greater than a frequency of data value associated with the other data stored in the at least one persistent non-volatile storage device, wherein the first portion of data is available to read operations and write operations while stored in the buffer cache of the volatile memory;
  overriding the data retention policy of the buffer cache to exclude, with the processor, the first portion of data from being overwritten by other data stored in the at least one persistent non-volatile storage devices while the other data stored in the persistent non-volatile storage devices being accessed for use and the first portion of data not actively being accessed for use, while the frequency of data value associated with the first portion of data remains greater than a frequency of data value associated with the at least a portion of the data of the database stored in the array of persistent non-volatile storage devices, the first portion of data is the least recently used data in the buffer cache and size of the other data is greater than free space in the buffer cache.

10. The method of claim 9, further comprising:
  receiving, with the processor, a user-based input including the first portion of data; and
  performing, with the processor, an initial load of the first portion of data into the buffer cache.

11. The method of claim 9, further comprising:
  determining, with the processor, to retrieve the first portion of data from the at least one persistent non-volatile storage device;
  retrieving, with the processor, the first portion of data from the at least one persistent non-volatile storage device; and
  loading, with the processor, the first portion of data into the buffer cache.

12. The method of claim 9, further comprising:
  determining a frequency of data value of a second portion data from the database stored in the at least one persistent non-volatile storage device; and
  replacing the first portion of data in the buffer cache with the second portion of data in response to the frequency of data value of the second portion of data being greater than the first portion of data for a predetermined period of time.

13. The method of claim 9, further comprising:
  determining a frequency of data value of a second portion of data from the database stored in the at least one persistent non-volatile storage device; and
  replacing the first portion of data in the buffer cache with the second portion of data in response to the frequency of data value of the second portion of data being greater than the first portion of data by a predetermined threshold value.

14. The method of claim 9, further comprising determining, with the processor, the frequency of data value associated with the first portion of data based on a number cache hits on the buffer cache.

15. A non-transitory computer-readable medium encoded with a plurality of instructions executable by a processor, the plurality of instructions comprising:
  instructions to monitor a frequency of data value associated with the first portion of data stored in a volatile memory device, wherein the buffer cache is configured to implement a data retention policy, wherein the data retention policy is configured to overwrite least-recently used data in the buffer cache when new data is to be loaded into the buffer cache and size of the new data is greater than free space in the buffer cache;
  instructions to determine at least one other frequency of data value associated with other data of the database, wherein the other data is stored in a persistent non-volatile storage device;
  instructions to maintain the first portion of data in the volatile memory device in response to the frequency of data value of the first portion of data being greater than a frequency of data value associated with the other data stored in the non-volatile persistent storage device, wherein the first portion of data is available to read operations and write operations while stored in the volatile memory; and
  instructions to override the data retention policy of the buffer cache to exclude the first portion of data from being overwritten by the other data stored in the persistent non-volatile storage devices while the other data stored in the persistent non-volatile storage devices being accessed for use and the first portion of data not actively being accessed for use, while the frequency of data value associated with the first portion of data remains greater than a frequency of data value associated with the at least a portion of the data of the database stored in the array of persistent non-volatile storage devices, the first portion of data is the least recently used data in the buffer cache and size of the other data is greater than free space in the buffer cache.

16. The non-transitory computer-readable medium of claim 15, wherein the plurality of instructions further comprises instructions to determine frequency of data of the first portion of data based on at least one of frequency of access of the first portion of data by a processor and a number hits on the volatile memory device.

17. The non-transitory computer-readable medium of claim 15, wherein the plurality of instructions further comprises:

instructions to determine a frequency of data value of a second portion of the data of the database stored in the persistent non-volatile storage device; and instructions to replace the first portion of data in the volatile memory device with the second portion of data in response to the frequency of data value of the second portion of data being greater than the frequency of data of the first portion of data.

18. The non-transitory computer-readable medium of claim 17, wherein the plurality of instructions further comprises instructions to update a heat map to indicate replacement of the first portion of data with the second portion of data.

19. The non-transitory computer-readable medium of claim 15, wherein the plurality of instructions further comprises:

instructions to determine a frequency of data value of a second portion of the data of the database stored in the persistent non-volatile storage device; and instructions to replace the first portion of data in the volatile memory device with the second portion of data in response to the frequency of data value of the second portion of data being greater than the frequency of data of the first portion of data for a predetermined period of time.

20. The non-transitory computer-readable medium of claim 15, wherein the plurality of instructions further comprises:

instructions to determine a frequency of data value of a second portion of the data of the database stored in the persistent non-volatile storage device; and instructions to replace the first portion of data in the volatile memory device with the second portion of data in response to the frequency of data value of the second portion of data being greater than the first portion of data by a predetermined threshold value.

* * * * *